Jan. 11, 1927.　　　V. MARTINETTO　　　1,614,009
ASYNCHRONOUS MACHINE
Filed Jan. 23, 1924　　　3 Sheets-Sheet 1

Inventor
Vittorio Martinetto
By Edgar S. Brandenburg
Attorney

Jan. 11, 1927. 1,614,009
V. MARTINETTO
ASYNCHRONOUS MACHINE
Filed Jan. 23, 1924   3 Sheets-Sheet 2

Inventor
Vittorio Martinetto
By Edgar T. Brandenburg
Attorney

Jan. 11, 1927.　　　　　　　　　　　　　　　　1,614,009
V. MARTINETTO
ASYNCHRONOUS MACHINE
Filed Jan. 23, 1924　　　3 Sheets-Sheet 3

Inventor
Vittorio Martinetto
By Edgar T. Brandenburg
Attorney

Patented Jan. 11, 1927.

1,614,009

UNITED STATES PATENT OFFICE.

VITTORIO MARTINETTO, OF TURIN, ITALY.

ASYNCHRONOUS MACHINE.

Application filed January 23, 1924. Serial No. 688,016, and in Italy January 26, 1923.

This invention relates to asynchronous machines and i!s objects are the starting with a good torque without inserting ohmic resistances, the improvement of the power factor and the economic regulation of speed.

The word motor is generally used hereinafter, also to denote a generator.

According to my present invention, in ordinary induction motors I utilize the primary and secondary end connections and the magnetic frontal fields set up thereby. In order that these fields can be utilized I provide circuits of a relatively low reluctance in such a way as to cause their lines of force to cross almost totally the fields set up in the air gap by the connections parallel to the shaft of the same windings, and I cause only the primary frontal fields to interlink with the secondary end connections, while I so arrange the latters that the secondary frontal fields will be stray-fields.

The purposes above specified are accomplished by means of the addition—in the secondary circuit of ordinary induction motors—of magnetic bridges of several constructions, which will aid to form a circuit of very low reluctance around the primary and secondary end connections, the said circuit passing through the laminated cores and said bridges so as to take—around the end connections—the shape of a U having the base parallel to the machine shaft and the arms placed one inwardly and the other outwardly of the said end connections.

Such a circuit will therefore be caused to cross the lines of the field in the air gap and to totally in!erlink with the secondary end connections.

For the purpose of causing the primary frontal field to totally interlink with the secondary end connections, the said magnetic bridges must be placed on the opposite side of the primary end connections in respect of the secondary ones. In ordinary machines with external primary winding (external stator) the magnetic bridges will be placed internally of the rotor laminated core (see Fig. 6).

On the other hand, the intersection of the field due to the connections parallel to the shaft with the frontal fields will force the latter to be distorted, the secondary field being thereby prevented from reacting upon the primary inductive field. (Generally speaking, such a distortion is not contained in a plane, so that it will be hardly shown in a diagrammatic and approximative manner in the drawings—see Figs. 1 and 4, where the lines of force $\Phi_1$ and $\varphi_1$ do not exactly lie in the plane of the drawing— but evidently the lines of force of a magnetic field, crossing the lines of another field practically at right angles to the former, will set up a distortion of these lines).

The path heretofore described is followed by the lines of force due to the primary, because of the reluctance of this circuit, less than in ordinary induction motors, where the lines of force of the primary and secondary frontal fields are closed through the air, independently of the secondary and primary end connections, i. e. without interlinking with the latter.

In ordinary induction motors with complete end shields, while having the arms of the U-shaped magnetic circuit, there is no magnetic bar or bridge forming the base thereof, which is the main feature of the machines according to the present invention and to which is exclusively due to the fact of changing the primary magnetic fields from stray-fields to magnetizing fields, and of causing them to cross the field generated in the air gap.

For the aforesaid purposes (crossing and interlinking of frontal fields) it is not essential to complete through magnetic material the circuit of the end connections between the ends of the arms of U. It will be seen, however, that such a closure produces a variation of the magnetizing component required by the primary end connections, and causes the dispersion of the secondary field to vary, influencing thereby the mode of operation and the characteristics of the motor.

The annexed drawings show some diagrams and some embodiments by way of example of induction motors according to this invention.

Figure 6:
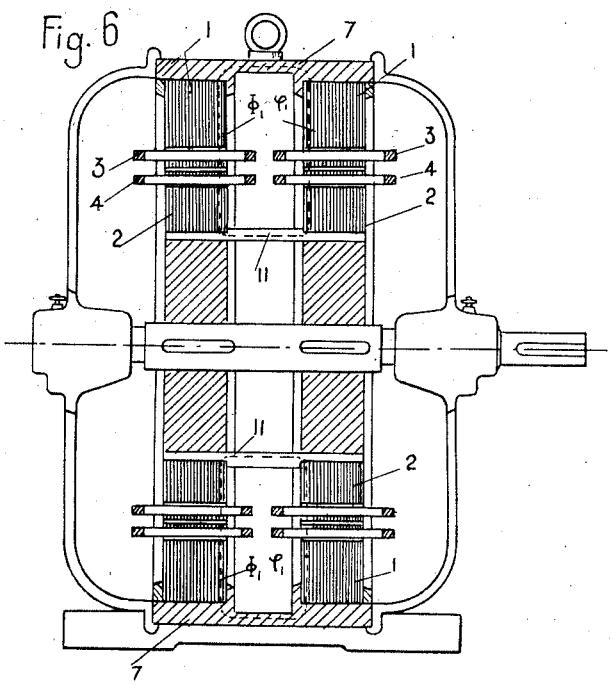
Figure 7:
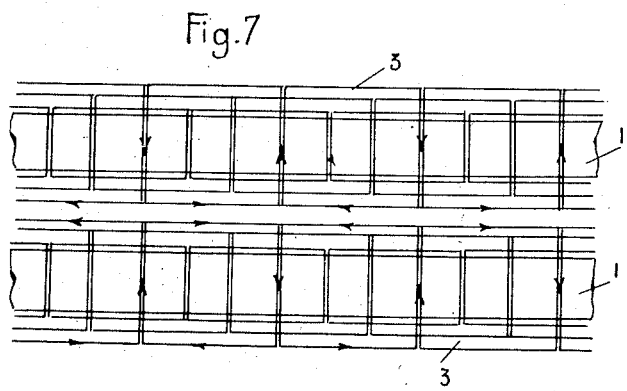
Figure 8:
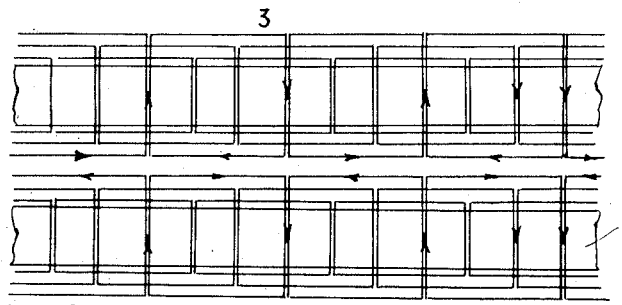
Figure 9:
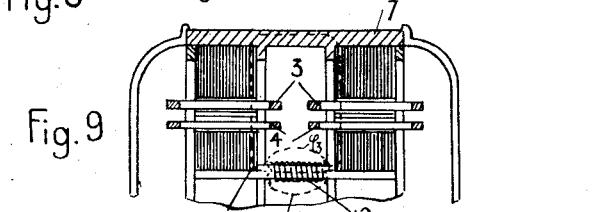
Figure 10:
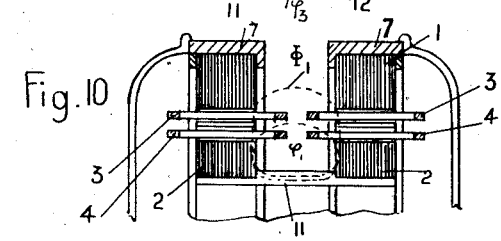
Figure 11:
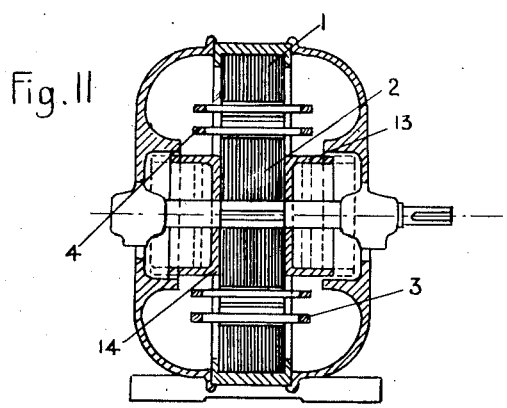

Fig. 6 diagrammatically shows a construction of double-type motor according to this invention;

Figs. 7 and 8 show a portion of the laminated stator cores, developed in a plane, of the motor shown in Fig. 6, the relative position of the primary end connections being diagrammatically shown, the current direction being indicated by arrows in two different cases;

Figs. 9 and 10 are modifications, in partial cross section, of the motor shown in Fig. 6;

Fig. 11 is a further embodiment of a motor according to this invention.

Figure 1:
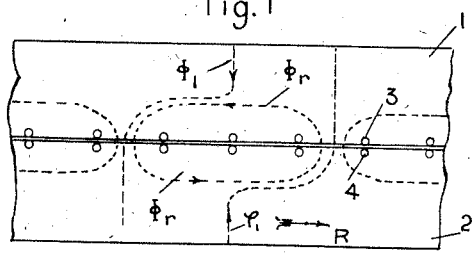
Fig. 1 shows a portion of the primary and secondary laminated cores of an ordinary induction motor, developed in a plane.
Figure 2:
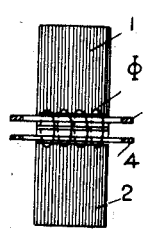
Fig. 2 is a cross section thereof.

Referring first to Figs. 1 and 2, 1 is the stator and 2 the rotor laminated core, having slots wherein the primary winding 3 and the secondary winding 4 are respectively arranged.

$\Phi_r$ denotes the resultant field generated in the air gap by the windings 3 and 4 parallel to the shaft, while $\Phi_1$ denotes the frontal field due to the primary end connections and $\phi_1$ the frontal field due to the secondary ones.

Figure 3:
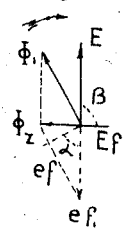
Fig. 3 shows by the vectorial system the displacement of phases between the voltage and the fields generated by the end connections of the motor shown in Figs. 1 and 2.

In Fig. 3, E denotes the supply voltage, e the resultant secondary voltage displaced through an angle of 180° from E, while $E_t$ and $e_t$ respectively denote the voltages induced by the fields $\phi_1$ and $\Phi_1$, displaced through angles $\alpha$ and $\beta$ from e and E respectively.

Figure 4:
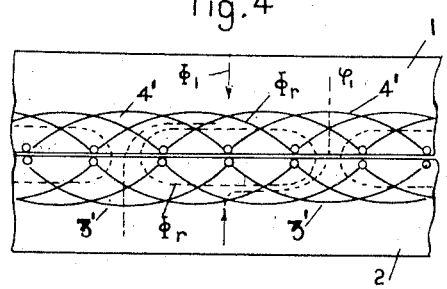
Fig. 4 is similar to Fig. 1, the primary and secondary end connections being also shown.

In Fig. 4, 3' denotes the primary end connections and 4' the secondary end connections of one phase of the motor windings.

As said, it will be noted from Figs. 1 and 4 that the lines of force $\Phi_1$ and $\phi_1$, crossing with the resultant field $\Phi_r$, in the air gap, are distorted away from their path; such a distortion, only diagrammatically shown, will generate a reciprocal reaction of the frontal fields and the field in the air gap.

Figure 5:
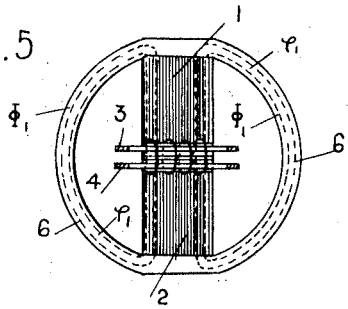
Fig. 5 is a cross section like that of Fig. 2, showing additional magnetic bridges surrounding the end connections.

Furthermore, by adding in the magnetic circuit of the fields due to the end connections, as shown in Fig. 5, additional magnetic bridges 6 placed around the primary and secondary end connections, forming with other parts of the motor a circuit of very low reluctance, the interlinking of the primary frontal fields with the secondary end connections will be facilitated. It must be noted that in Fig. 5 the additional magnetic bridges have been shown, for the sake of explanation only, without leaving any air gap for the rotation of the secondary in respect of the primary.

In the embodiment shown in Fig. 6, the primary laminated cores 1 are fixed in the usual way to the stator frame 7, while the secondary cores 2 are supported by a cylindrical body 11 made of magnetic material, the portion of the cylindrical wall of said body comprised between the two coupled rotors serving to complete the U-shaped magnetic circuit of the end connections comprised between the four laminated cores.

The cylindrical body 11 and the cores 2 supported thereby are fastened to the common shaft of the motor. The end connections of each primary winding 3 and of each secondary winding 4 are arranged as symmetrically as possible, and it is preferred to employ as a secondary a wound rotor and not a squirrel cage. In this constructional embodiment only the fields due to the end connections enclosed by the four laminated cores are utilized, no particular magnetic circuit being therefore required for the other end connections, arranged externally of the fronts of both pairs of cores. The secondary windings 4 of both rotors may be connected in series or may each be short-circuited.

Figures 7 and 8 diagrammatically show the primary three-phase windings of the motor shown in Fig. 6, in one only of the phases (for the sake of simplicity) the direction of the current being shown by arrows, in two different cases: by the direction of the feed-current shown by the arrows of Fig. 7 the magneto motive forces of the end connections of both cores add together, while by the direction shown in Fig. 8 they are annulled. These are the two limit cases, of maximum and minimum frontal fields, which will be utilized for the regulation of the torque.

The magnetic circuit of the end connections in the alternative shown in Fig. 9 is completed, in lieu of the cylindrical body provided according to Fig. 6, by a number of transversal bars 11, arranged parallel to the shaft, over which an auxiliary winding 12 connected in series to the secondary winding 4 is wound. Such an additional winding is interlinked with the primary frontal field $\Phi_1$, and generates stray-fields $\phi_3$ closing through the air. These auxiliary windings 12 are preferably so arranged that the magnetic axis set up thereby will coincide with the axis of the field due to the windings 4.

In the embodiment shown in Fig. 10, the frame 7 is not utilized to close therein the frontal magnetic circuit, thus leaving opened the interval between the two arms of the U. As shown in the drawing all the primary frontal field $\Phi_1$ is interlinked as well with the end connections generating it, as with the secondary end connections 4', while the field $\varphi_1$ generated by the latters is almost totally a stray field, since it is interlinked with the primary end connections only through a very low portion of its lines of force. The embodiment shown in this figure allows a magnetic circuit conforming in the best way to the requirements heretofore disclosed; to create a magnetic U-shaped circuit for the purpose of causing the lines of the primary frontal field to be interlinked with the secondary end connections, and moreover to cause the frontal fields, primary as well as secondary, to cross the lines of the field in the air gap.

In the embodiment shown in Fig. 11, 13 and 14 denote a pair of cups made of magnetic material axially displaceable along the motor shaft, and fitting recesses provided internally of the end shields. It will be easily understood that such cups replace—as to the generation of the special low reluctance circuit—as well the cylindrical body as the separate transverse bars 11, provided in the embodiments of motors formerly described.

The displacement of the said cups not only permits of varying the reluctance of the frontal magnetic circuit, but also of breaking it in the portion corresponding to the U-base, as happens when the cups are in the position shown by dotted lines.

While in the embodiment shown in Fig. 6, by only referring to the magnetic circuits of the end connections enclosed between the four laminated cores, the main portion of said magnetic circuit will pass through laminated material. In the embodiment shown in Fig. 11 such a result may not be reached, since the main portion of said circuit is contained in the cups and motor shields, which of course cannot be made of laminated magnetic material. It will therefore be preferable to employ the latter embodiment only for the starting and the improvement of the power factor at low load.

The advantages obtained by machines according to this invention can be explained as follows:

The interlinking of the lines of force of the field $\Phi_1$ with the secondary end connections produces the diminution of the primary frontal stray-fields and the induction of energy from the primary to the secondary winding, while the crossing of the lines of force due to the primary and secondary end connections with the field $\Phi_r$ in the air gap produces a reciprocal reaction between the frontal fields and the field in the air gap. Because of the considerable difference between the reluctance of the frontal circuits $\Phi_1$ and $\varphi_1$, and that of the air gap circuit $\Phi_r$, the former will be displaced as regards the latter, and will be distorted in opposite directions to each other by crossing same. Consequently, the M. M. F. respectively due to the primary and secondary end connections are first prevented from generating a common resultant, and moreover the secondary field $\varphi_1$ is prevented from reacting upon the primary magnetizing field $\Phi_1$.

The field $\Phi_1$ will take a value proportional to the value of the current in the primary winding, and the same phase thereof; while on the contrary the secondary field $\varphi_1$, being prevented from reacting upon $\Phi_1$ because of the distortion heretofore explained, will induce in the same windings a reacting voltage, corresponding to the reaction failing between $\varphi_1$ and $\Phi_1$, of like value and opposite sense to that induced by the field $\Phi_1$.

Since the fundamental equilibrium requirement is that the resultant of the voltages induced in the primary and secondary windings, as well by the frontal fields as by the field in the air gap, be balanced by the impressed voltage; if the secondary frontal field is partially or totally a stray-field, the E. M. F. failing thereby in the primary winding shall be replaced by an E. M. F. induced in said winding by the field in the air gap.

On the other hand, since the voltage induced by the field $\varphi_1$ in the primary winding is a reactive voltage, i. e. a voltage generated by a field in phase with the secondary current, the field in the air gap to induce a like voltage should be displaced; such a displacement will be realized if the secondary M. M. force has a value greater than that of the primary M. M. force.

From the aforesaid it will be understood that if the secondary frontal field is totally or partially a stray-field, the value of the ampere-turns in the secondary will be greater than the corresponding value in the primary. The latter is the main feature characterizing the object of this invention from all the constructions of asynchronous machines heretofore known, the mode of operation of the new machines being substantially different from the mode of operation of such machines.

The same phenomena heretofore disclosed may be further explained referring to the diagram shown in Fig. 3.

The frontal field $\Phi_1$, in phase with the primary current, will induce in the primary and secondary windings interlinked with it a voltage $e_t$ lagging through 90° over $\Phi_1$ and in advance through an angle $\alpha$ over the resulting voltage $e$, which shall counterbalance the supply voltage E; the secondary frontal field $\varphi_1$ in phase with the secondary current, will induce in the windings interlinked with it a voltage $E_t$ lagging through 90° over $\varphi_1$ and in advance through an angle $\beta$ over the supply voltage E.

Two cases shall be considered:

I. If the geometrical resultant $e_t + E_t$ has like value and opposite direction to E, which will happen when the values of fields $\Phi_1$ and $\varphi_1$ interlinked with secondary and primary end connections will be equal, the equilibrium of voltages will be reached by means of only the end connections.

In the air gap the field $\Phi_r$ will be lagging through 90° over the supply voltage E, since the latter must be balanced by only the voltage induced by this field; in any case the field $\Phi_r$ will have a very low value, being a minimum the voltage of the windings parallel to the shaft relatively to the voltage required by the frontal field $\Phi_1$, which is balanced by no reaction from the field $\varphi_1$.

II. If on the contrary the geometrical sum $e_t + E_t$ be of lesser value than the supply voltage E, and is not opposite to the latter, which will happen when $\varphi_1$ is partially or totally a stray-field, the failing voltage—to reach the required condition of voltage equilibrium—will be induced in the primary winding by the field in the air gap, whose phase should be displaced from the position shown in Fig. 3, to be in a position of inducing in said winding, some E. M. F. which will replace the one which would have to be induced by $\varphi_1$ and which, added with the resultant $e_t + E_t$ shall set up the required equilibrium with the supply voltage.

But since the field $\varphi_1$ is in phase with the secondary current, the field in the air gap—to be able to induce in the primary a voltage of suitable phase—shall take the phase of $\varphi_1$, that is to say that in the air gap the M. M. F. generated by the secondary current shall be the greater one.

As a conclusion, the operative characteristics of the machines according to this in-invention are the following:

(A) The magnetic field in the air gap will not aid in transmitting energy to the secondary, by being displaced through an angle lesser than 90° from the M. M. F. due to the secondary itself; therefore there is the only primary frontal field $\Phi$ which will energize the secondary winding;

(B) Since the field in the air gap takes the phase of the secondary current, the same will not be able to set up any torque by reacting upon the secondary windings parallel to the shaft, having the same phase, while in ordinary induction motors the torque is generated in the air gap;

(C) The torque set up in motors according to this invention is due to the reaction of the primary frontal field $\Phi_1$ upon the secondary windings parallel to the shaft. Such a torque will therefore vary in a double way by the variation of the current absorbed by the primary, since by the increase (for instance) of the latter, the field $\Phi_1$ proportional thereto will increase, and simultaneously the secondary current being due to the same field will also increase.

The value of the torque and thereby (as in usual induction motors) the speed may be varied by three fundamental means:

(1) By directly modifying the value of the field $\Phi_1$, i. e. of the current absorbed in the primary winding;

(2) By indirectly modifying the value of the same field; and (3) By modifying the value of the voltage induced thereby in the secondary.

To directly vary the value of the field $\Phi_1$, the value of the impressed voltage may be varied by one of the well known regulation means.

By the double type motor shown in Fig. 6, the inclusive value of the frontal fields (due to the end connections enclosed by the four laminated cores) may be varied by gradually passing from the maximum value, which will be had when the current has like direction in the end connections of both cores (see Fig. 7), to the zero value, which will be had when in the said end connections the current has opposite directions (see Fig. 8). Such a gradual passage may be obtained either by the actual relative displacement of both stators (which displacement may be gradually performed by any suitable mechanical means) or by gradually varying the phase in one of the windings relatively to the other, until they are in opposition.

The value of the voltage in the secondary may be varied by regulating the turns of the auxiliary windings 12 inserted in the secondary (Fig. 9).

By the construction shown in Fig. 11, the value of the primary frontal field $\Phi_1$ and of the dispersion of secondary frontal field may be varied at the same time, by displacing the cups 13 and 14—by any suitable mechanical means—relatively to the end shields of the motor, thereby varying the reluctance of the frontal circuits.

Since the inductive transmission of energy, as said, is exclusively due to the primary frontal field which is totally interlinked with the secondary connections, and since the secondary field does not react upon the primary because of the dispersion above specified, the primary frontal stray field will practically be nul. To this fact is substantially due the high value of the power factor ascertained in the machines constructed and operating according to this invention.

Although asynchronous machines provided with two stators and two rotors have been more particularly described and illustrated in the drawings, the addition of a cylindrical body or of bars made of magnetic material adapted to form the basis of the U-shaped magnetic circuit may also be done in usual machines provided a stator and a rotor only, and in this case the end shields are utilized as a part of the said U-shaped magnetic circuit having low reluctance.

What I claim as my invention is:

1. In an alternating current machine having the end connections arranged as uniformly as possible on the fronts thereof, the combination with the end connections of the primary and secondary windings, of auxiliary magnetic members providing a path for an additional magnetic circuit of comparatively low reluctance, said path lying in a plane substantially at right angles to the plane of the main magnetic circuit in the cores of the machine, said additional magnetic circuit surrounding said primary and secondary end connections.

2. In an alternating current machine having the end connections arranged as uniformly as possible on the fronts thereof, the combination with the end connections of the primary and secondary windings, of auxiliary magnetic members parallel to the shaft and placed relatively to the secondary winding from opposite sides to the primary winding, said members providing a path for an additional magnetic circuit of comparatively low reluctance, said path lying in a plane substantially at right angles to the plane of the main magnetic circuit in the cores of the machine, said additional magnetic circuit surrounding said primary and secondary end connections.

3. In an alternating current machine having laminated cores and a magnetic frame and the end connections arranged as uniformly as possible on the fronts of the machine, the combination with the end connections of the primary and secondary windings of auxiliary magnetic members providing a path for an additional magnetic circuit of comparatively low reluctance, said path lying in a plane substantially at right angles to the plane of the main magnetic circuit in the cores of the machine, said additional magnetic circuit being completed through the said auxiliary magnetic members, the laminated cores and the magnetic frame of the machine.

4. In an alternating current machine having windings, the end connections arranged as uniformly as possible on the fronts thereof, the combination with the end connections of the primary and secondary windings, of auxiliary magnetic members parallel to the shaft and placed relatively to the secondary winding on the opposite side of the primary winding from the secondary winding, and of auxiliary windings wound upon said magnetic members, said auxiliary windings being electrically connected to the main secondary winding and in inductive relation with the fields set up by the end connections of the primary and secondary windings.

5. In an alternating current machine having laminated cores and primary and secondary windings the end connections arranged as uniformly as possible on the fronts thereof, the combination with the end connections of the primary and secondary windings, of auxiliary magnetic members parallel to the shaft and placed relatively to the secondary winding on the opposite side of the primary winding from the secondary winding, the additional magnetic circuit provided by said auxiliary members and lying in a plane substantially at right angles to the plane of the main magnetic circuit being completed through the laminated cores, the field set up by the primary end connections embracing both primary and secondary end connections, while the field set up by the secondary end connections embraces the latter.

In witness whereof, I have hereunto signed my name.

VITTORIO MARTINETTO.